(12) United States Patent
Murray et al.

(10) Patent No.: US 11,172,615 B2
(45) Date of Patent: Nov. 16, 2021

(54) ELEVATOR ASSEMBLY FOR AN AGRICULTURAL HARVESTER WITH A DISTAL STORAGE HOPPER AND RELATED METHODS

(71) Applicant: CNH Industrial America LLC, New Holland, PA (US)

(72) Inventors: Craig E. Murray, Davenport, IA (US); Francisco Mezzomo, Bettendorf, IA (US); Michael J. Matway, Litchfield, IL (US); William Lawson, Mathews, LA (US); Carlos Visconti, São Paulo (BR)

(73) Assignee: CNH Industrial America LLC, New Holland, PA (US)

( * ) Notice: Subject to any disclaimer, the term of this patent is extended or adjusted under 35 U.S.C. 154(b) by 168 days.

(21) Appl. No.: 16/466,870

(22) PCT Filed: Dec. 4, 2017

(86) PCT No.: PCT/US2017/064422
§ 371 (c)(1),
(2) Date: Jun. 5, 2019

(87) PCT Pub. No.: WO2018/106563
PCT Pub. Date: Jun. 14, 2018

(65) Prior Publication Data
US 2020/0060087 A1  Feb. 27, 2020

Related U.S. Application Data

(60) Provisional application No. 62/429,946, filed on Dec. 5, 2016.

(51) Int. Cl.
*A01D 61/00* (2006.01)
*A01D 41/12* (2006.01)
*A01D 45/10* (2006.01)

(52) U.S. Cl.
CPC ......... *A01D 61/00* (2013.01); *A01D 41/1208* (2013.01); *A01D 45/10* (2013.01)

(58) Field of Classification Search
CPC .... A01D 61/00; A01D 61/02; A01D 41/1208; A01D 45/10; A01D 91/04; A01D 75/182
(Continued)

(56) References Cited

U.S. PATENT DOCUMENTS 3,085,517 A   4/1963  Smith
3,415,371 A  12/1968  Schultz
(Continued)

FOREIGN PATENT DOCUMENTS

WO    2015156774 A1   10/2015

*Primary Examiner* — Alicia Torres
*Assistant Examiner* — Matthew Ian Neal
(74) *Attorney, Agent, or Firm* — Peter Zacharias; Patrick Sheldrake

(57) ABSTRACT

An elevator assembly for a harvester may include an elevator extending within between proximal and distal ends. The elevator may be configured to carry harvested crops between its proximal and distal ends. The elevator assembly may also include a storage hopper at a location adjacent to the distal end of the elevator. The storage hopper may include a rear deflector and a hopper gate. The hopper gate may be movable between a discharge position, at which the hopper gate exposes a discharge opening of the storage hopper, and a storage position, at which the hopper gate covers the discharge opening to prevent harvested crops from being discharged from the elevator assembly. Additionally, when the hopper gate is moved to the storage position, the hopper gate and the rear deflector may at least partially define a storage volume adjacent to the distal end of the elevator for storing the harvested crop.

19 Claims, 4 Drawing Sheets

(58) Field of Classification Search
USPC .............................................. 56/153
See application file for complete search history.

(56) References Cited

U.S. PATENT DOCUMENTS

| | | | |
|---|---|---|---|
| 4,121,778 | A | 10/1978 | Quick |
| 5,031,392 | A | 7/1991 | Baker |
| 6,068,059 | A | 5/2000 | Bajema et al. |
| 6,272,819 | B1 | 8/2001 | Wendte et al. |
| 7,681,388 | B1 | 3/2010 | Hinds et al. |
| 7,805,916 | B2 | 10/2010 | Hinds et al. |
| 2002/0133309 | A1 | 9/2002 | Hardt |
| 2006/0277883 | A1 | 12/2006 | Berger et al. |
| 2007/0266690 | A1 | 11/2007 | Buehler et al. |
| 2007/0270200 | A1 | 11/2007 | Smith |
| 2010/0307121 | A1 | 12/2010 | Marchini |
| 2011/0308222 | A1 | 12/2011 | Sauerwein |
| 2017/0112059 | A1* | 4/2017 | Craig .................. A01D 41/1271 |
| 2019/0053427 | A1* | 2/2019 | Matway ................ A01D 45/10 |
| 2019/0124848 | A1* | 5/2019 | Johnson ................ A01D 90/10 |
| 2020/0128743 | A1* | 4/2020 | Pereira ............... A01D 41/1217 |

\* cited by examiner

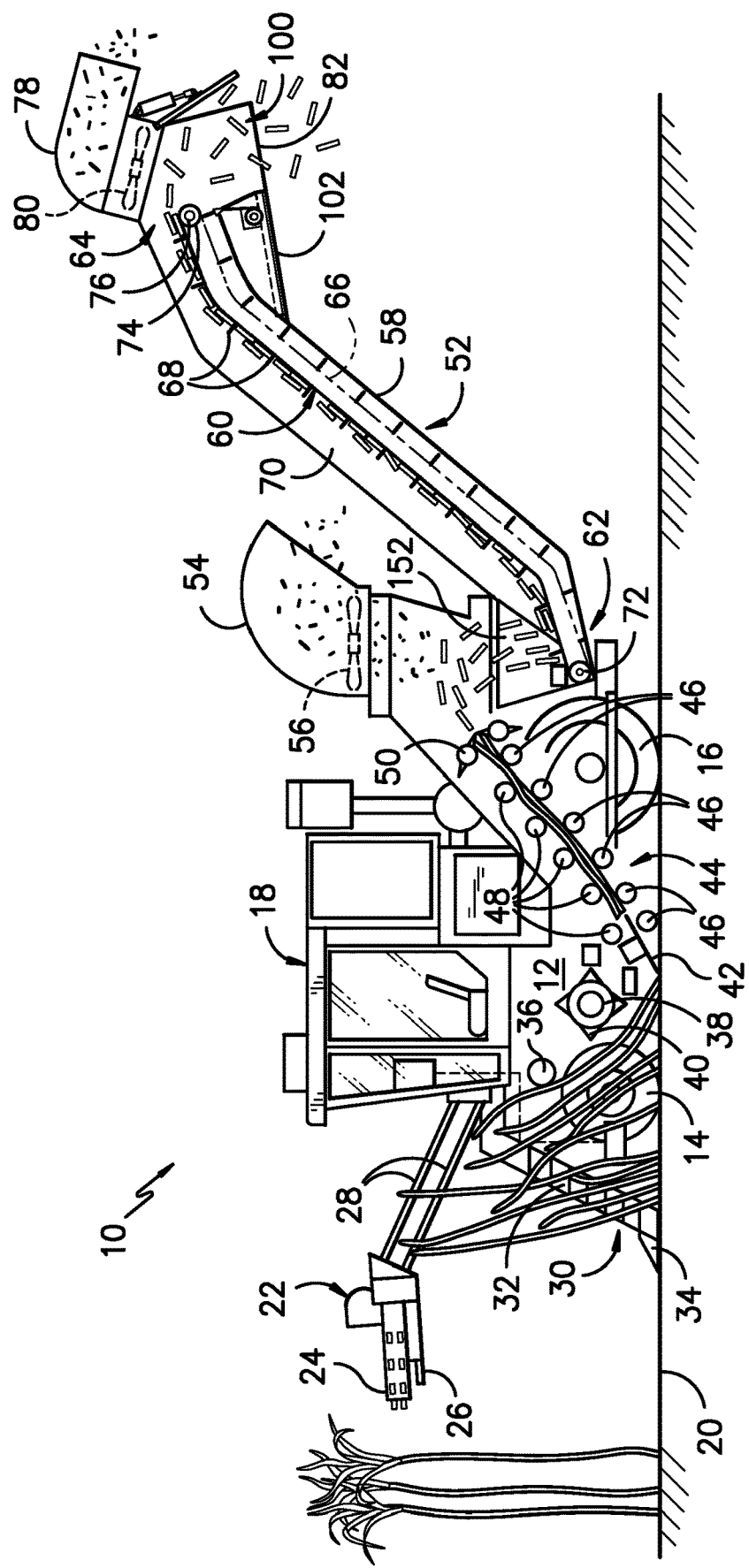
FIG. -1-

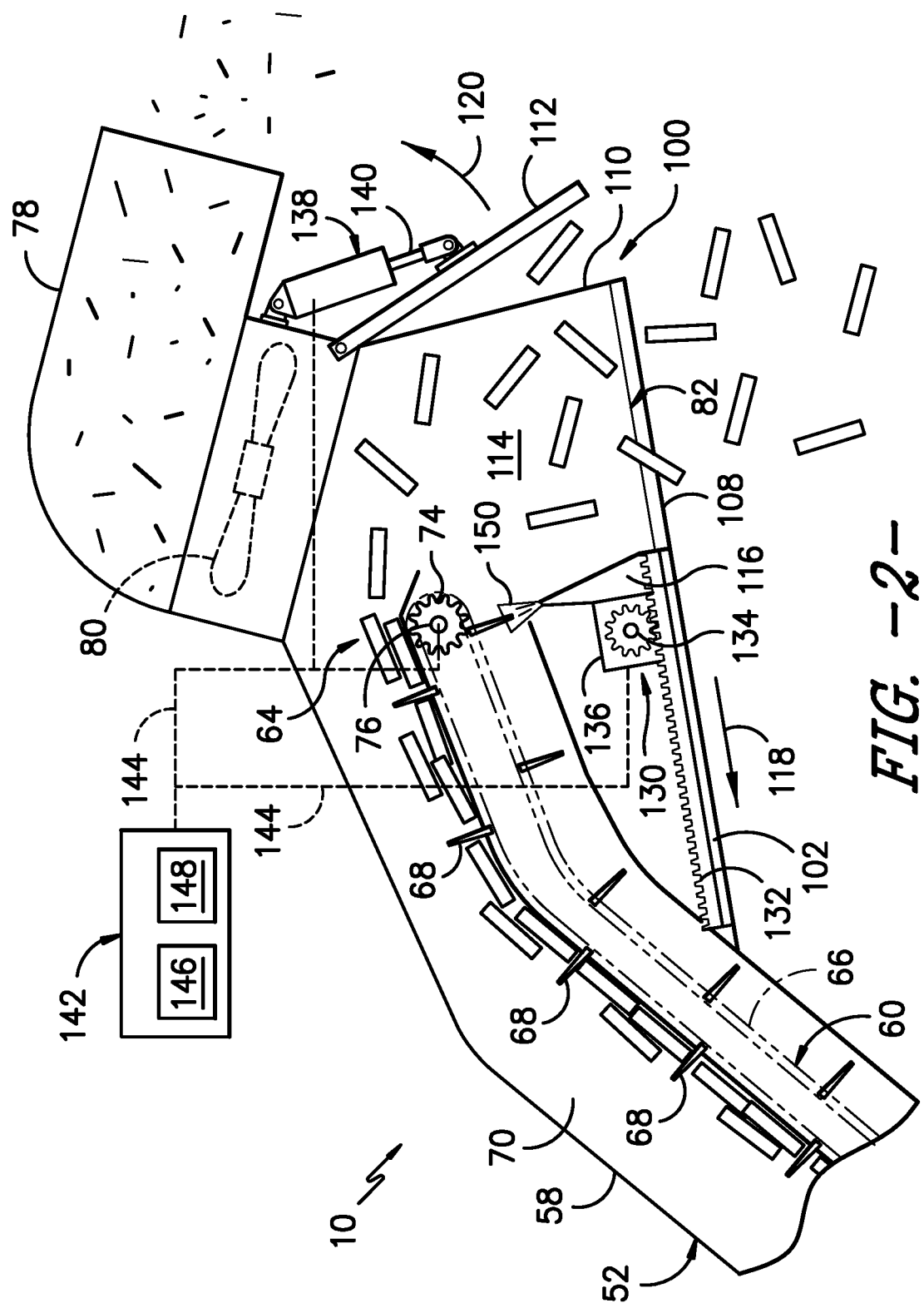
FIG. -2-

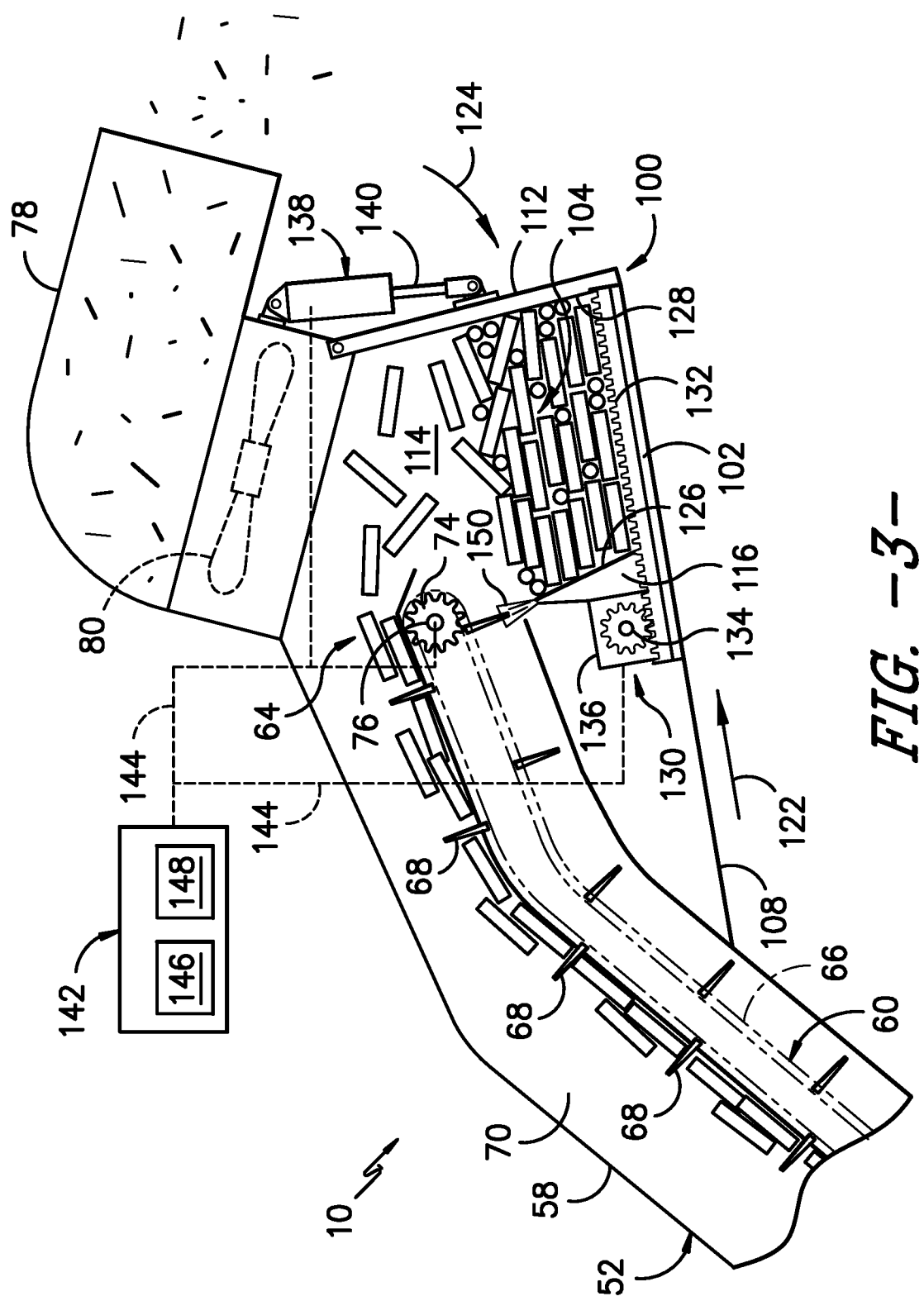
FIG. -3-

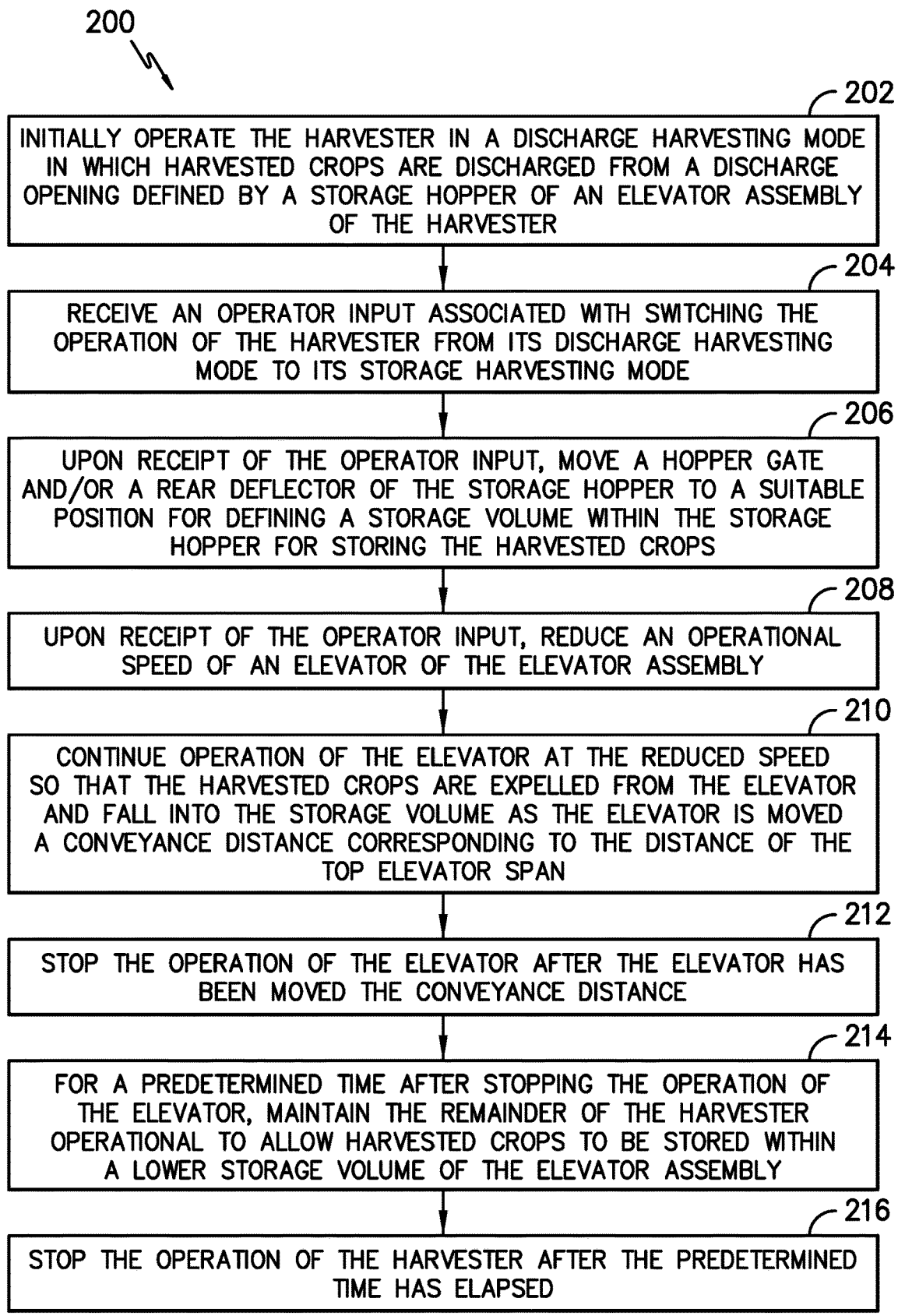
FIG. —4—

ELEVATOR ASSEMBLY FOR AN AGRICULTURAL HARVESTER WITH A DISTAL STORAGE HOPPER AND RELATED METHODS

FIELD OF THE INVENTION

The present subject matter relates generally to agricultural harvesters, such as sugar cane harvesters, and, more particularly, to an elevator assembly for an agricultural harvester with a storage hopper located at its distal end and related methods for operating the harvester using the hopper.

BACKGROUND OF THE INVENTION

Typically, agricultural harvesters are accompanied by a receiver for harvested crops, such as a truck that is driven beside or behind the harvester, or a wagon towed by a truck or tractor. An unloading conveyor or elevator extends from the harvester and is operable during the harvesting operation as it moves along the field for unloading the harvested crops to the accompanying receiver.

Some harvesters, particularly combine harvesters, have an on-board crop carrying capability, such as a large grain tank, so as to not need to be constantly accompanied by a receiver for the harvested crops. Other harvesters have only limited on-board carrying capability and require substantially constant accompaniment by an external receiver or storage device. For instance, sugar cane harvesters have an elongate, upwardly inclined elevator that utilizes one or more circulating chains to convey paddles or other crop carrying elements upwardly along an upwardly facing top span of the elevator, and downwardly along a downwardly facing bottom span of the elevator in an endless loop. Harvested sugar canes are typically cut into shorter billets and then carried by the paddles upwardly along the top span of the elevator and for subsequent discharge from the distal end of the elevator into the accompanying receiver, such as a billet cart.

When an external receiver for a sugarcane harvester is absent or is otherwise not properly positioned relative to the harvester, the unloading elevator must be stopped to prevent the conveyed billets from being discharged onto the ground. This situation can arise under a variety of conditions, such as if the accompanying receiver is full and must leave the harvester to unload. As another example, the receiver may often be a towed wagon that (along with its towing vehicle) defines a larger turning radius that the harvester itself. In such instances, when a turn is being executed at the end of the field, the receiver may not be immediately present for receiving the harvested crops. As a result, the harvester may have to pause operation until the receiver is able to be properly positioned relative to the harvester. In either situation, there is significant loss in the productivity of the harvester.

Accordingly, an improved elevator assembly for an agricultural harvester that has a storage hopper to allow for continued harvesting in the absence of an accompanying receiver would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an elevator assembly for a harvester. The elevator assembly may include an elevator housing and an elevator extending within the elevator housing between a proximal end and a distal end. The elevator may be configured to carry harvested crops between its proximal and distal ends. The elevator assembly may also include a storage hopper extending from the elevator housing at a location adjacent to the distal end of the elevator. The storage hopper may include a rear deflector and a hopper gate. The hopper gate may be movable between a discharge position, at which the hopper gate exposes a discharge opening of the storage hopper to allow the harvested crops to be discharged from the elevator assembly through the discharge opening, and a storage position, at which the hopper gate covers the discharge opening to prevent the harvested crops from being discharged from the elevator assembly. Additionally, when the hopper gate is moved to the storage position, the hopper gate and the rear deflector may be configured to at least partially define a storage volume adjacent to the distal end of the elevator for storing the harvested crop.

In another aspect, the present subject matter is directed to a method for operating a harvester. The harvester may include an elevator assembly having an elevator extending between a proximal end and a distal end. The elevator assembly may also include a storage hopper positioned adjacent to the distal end of the elevator. The storage hopper may include a rear deflector and a hopper gate movable between a discharge position and a storage position. The method may include initially operating the harvester in a discharge harvesting mode such that harvested crops are conveyed from the proximal end of the elevator to the distal end of the elevator and subsequently discharged from the harvester through a discharge opening defined by the storage hopper when the hopper gate is at its discharge position. In addition, the method may include receiving an operator input associated with operating the harvester in a storage harvesting mode and, upon receipt of the operator input, moving the hopper gate from its discharge position to its storage position such that the hopper gate covers the discharge opening. The method may also include storing the harvested crops expelled from the distal end of the elevator within a storage volume at least partially defined by the hopper gate and the rear deflector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, side view of one embodiment of an agricultural harvester in accordance with aspects of the present subject matter;

FIG. 2 illustrates a side view of a distal portion of an elevator assembly of the harvester shown in FIG. 1, particularly illustrating components of a storage hopper of the elevator assembly at an open or discharge position(s) to allow harvested crops to be discharged from the elevator assembly;

FIG. 3 illustrates another side view of the distal portion of the elevator assembly shown in FIG. 2, particularly illustrating the components of the storage hopper at a closed or storage position(s) to allow harvested crops to be temporarily stored within the storage hopper; and FIG. 4 illustrates a flow diagram of one embodiment of a method for operating a harvester in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an elevator assembly for an agricultural harvester that includes a storage hopper at its distal end for temporarily storing harvested crops therein. Specifically, in several embodiments, the storage hopper may include one or more movable hopper components configured to be moved between an open or discharge position(s) at which the harvested crops expelled from the distal end of the elevator may be discharged from the hopper into an external receiver or storage device and a closed or storage position(s) at which the harvested crops may be stored within a storage volume defined by the hopper. As such, when the external receiver or storage device is not properly positioned relative to the harvester, the hopper component(s) may be moved to the associated closed or storage position(s) to allow the harvested crops expelled from the distal end of the elevator to be stored within the storage volume of the hopper without discontinuing operation of the elevator and/or the remainder of the harvester.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester. 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in the forward direction.

As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continued to be moved in the forward direction relative to the field 20.

Referring still to FIG. 1, the harvester 10 may also include a base cutter assembly 42 positioned behind the fin roller 38. As is generally understood, the base cutter assembly 42 may include blades (not shown) for severing the sugar cane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugar cane as the cane is knocked down by the fin roller 38.

Moreover, the harvester 10 may include a feed roller assembly 44 located downstream of the base cutter assembly 42 for moving the severed stalks of sugar cane from base cutter assembly 42 along the processing path. As shown in FIG. 1, the feed roller assembly 44 may include a plurality of bottom rollers 46 and a plurality of opposed, top pinch rollers 48. The various bottom and top rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" which may be, for example, six (6) inches long. The billets may then be propelled towards an elevator assembly 52 of the harvester 10 for delivery to an external receiver or storage device (not shown).

As is generally understood, pieces of debris (e.g., dust, dirt, leaves, etc.) separated from the sugar cane billets may be expelled from the harvester 10 through a primary extractor 54, which is located behind the chopper assembly 50 and is oriented to direct the debris outwardly from the harvester 10. Additionally, an extractor fan 56 may be mounted at the base of the primary extractor 54 for generating a suction force or vacuum sufficient to pick up the debris and force the debris through the primary extractor 54. The separated or cleaned billets, heavier than the debris being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugar cane billets on the elevator 60 as the billets are elevated along a top span 70 of the elevator 60 defines between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, pieces of debris (e.g., dust, dirt, leaves, etc.) separated from the elevated sugar cane billets may be expelled from the harvester 10 through a secondary extractor 78 coupled to the rear end of the elevator housing 58. As shown in FIG. 1, the secondary extractor 78 may be located adjacent to the distal end 64 of the elevator 60 and may be oriented to direct the debris outwardly from the harvester 10. Additionally, an extractor fan 80 may be mounted at the base of the secondary extractor 78 for generating a suction force or vacuum sufficient to pick up the debris and force the debris through the secondary extractor 78. The separated, cleaned billets, heavier than the debris expelled through the extractor 78, may then fall from the distal end 64 of the elevator 60. Typically, the billets may fall downwardly through a discharge opening 82 of the elevator assembly 52 into an external storage device (not shown), such as a sugar cane billet cart.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets (e.g., 6 inch cane sections). Airborne debris or chaff (e.g., dust, dirt, leaves, etc.) separated from the sugar cane billets is then extracted through the primary extractor 54 using suction created by the extractor fan 56. The separated/cleaned billets then fall downwardly into the elevator assembly 52 and travel upwardly via the elevator 60 from its proximal end 62 to its distal end 64. During normal operation, once the billets reach the distal end 64 of the elevator 60, the billets fall through the discharge opening 82 to an external storage device. Similar to the primary extractor 54, chaff is blown out from harvester 10 through the secondary extractor 78 with the aid of the extractor fan 80.

Additionally, in accordance with aspects of the present subject matter, the elevator assembly 52 may also include a storage hopper 100 coupled to the elevator housing 58 at a location adjacent to the distal end 64 of the elevator 60 (e.g., at a location below the elevator 60 and the secondary extractor 78). As shown in FIG. 1, the storage hopper 100 may be configured to at least partially define the discharge opening 82 of the elevator assembly 52. As will be described in greater detail below, the storage hopper 100 may include a hopper gate 102 that is movable between a discharge position and a storage position. When the hopper gate 102 is located at its discharge position, the harvester 10 may be operated in its typical unloading mode (e.g., referred to hereinafter as its discharge harvesting mode) in which the billets expelled from the distal end 64 of the elevator 60 fall through the discharge opening 82 to an associated external storage device. However, when the hopper gate 102 is located at its storage position, the hopper gate 102 may cover the discharge opening 82 to prevent the billets from being discharged from the elevator assembly 52. In such operating mode, the billets expelled from the distal end 64 of the elevator 60 may fall into a storage volume 104 defined by the storage hopper 100 for temporary storage therein.

Referring now to FIGS. 2 and 3, side views of a distal portion of the elevator assembly 52 shown in FIG. 1 are illustrated in accordance with aspects of the present subject matter, particularly illustrating the storage hopper 100 located adjacent to the distal end 64 of the elevator 60. Specifically, FIG. 2 illustrates the hopper gate 102 of the storage hopper 100 at its discharge position to allow the harvester 10 to be operated in its discharge harvesting mode. Similarly, FIG. 3 illustrates the hopper gate 102 of the storage hopper 100 at its storage position to allow the harvester 10 to be operated in its storage harvesting mode.

In several embodiments, the storage hopper 100 may be positioned at or adjacent to the distal end 64 of the elevator 60 such that billets expelled from the elevator 60 at its distal end 64 fall downwardly into the storage hopper 100. For instance, as shown in FIGS. 2 and 3, the storage hopper 100 may extend downwardly from the elevator housing 58 such that the hopper 100 includes a bottom side 108 spaced vertically apart from the elevator housing 58 at a location below the distal end 64 of the elevator 60 and a rear side 110 (FIG. 2) positioned below the secondary extractor 78.

In several embodiments, the storage hopper 100 may include a hopper gate 102 movable along the bottom side 108 of the hopper 100 and a rear deflector 112 movable relative to the rear side 110 of the hopper 100. The storage hopper 100 may also include a pair of sidewalls 114 (only one of which is shown) extending outwardly from the elevator housing 58 to the bottom and rear sides 110, 112 of the hopper 100. Additionally, as shown in FIGS. 2 and 3, the storage hopper 100 may include a front deflector 116 spaced forward of the rear side 110 of the hopper 100. In one embodiment, the discharge opening 82 of the elevator assembly 52 may be defined between the front deflector 116 and the rear deflector 112 along the bottom side 108 of the hopper 100.

As indicated above, the hopper gate 102 may be configured to be moved between a discharge position (FIG. 2) and a storage position (FIG. 3). Additionally, in one embodiment, the rear deflector 112 may be movable between an opened position (FIG. 2) and a closed position (FIG. 3). In several embodiments, when it is desired to operate the harvester 10 in its discharge harvesting mode, the hopper gate 102 may be moved to its discharge position while the rear deflector 112 may be moved to its opened position. For instance, as shown in FIG. 2, when in the discharge position, the hopper gate 102 may be moved away from the rear side 110 of the hopper 100 (e.g., in the direction of arrow 118) to expose the discharge opening 82 defined along the bottom side 108 of the hopper 100 between the front and rear deflectors 116, 112. Similarly, as shown in FIG. 2, when in the opened position, the rear deflector 112 may be pivoted relative to the rear side 110 of the hopper 100 away from both the hopper gate 102 and the front deflector 116 (e.g., in the direction of arrow 120) to enlarge the discharge opening 82. As such, harvested crop expelled from the distal end 64 of the elevator 60 may fall through the discharge opening 82 and, thus, may be discharged from the elevator assembly 52.

Moreover, when it is desired to operate the harvester 10 in its storage harvesting mode, the hopper gate 102 may be moved to its storage position while the rear deflector 112 may be moved to its closed position. For instance, as shown in FIG. 3, when in the storage position, the hopper gate 102 may be moved towards the rear side 110 of the hopper 100 (e.g., in the direction of arrow 122) to cover the discharge opening 82 defined along the bottom side 108 of the hopper 100. Similarly, as shown in FIG. 3, when in the closed position, the rear deflector 112 may be pivoted relative to the rear side 110 of the hopper 100 towards both the hopper gate 102 and the front deflector 116 (e.g., in the direction of arrow 124) until the rear deflector 112 contacts or is otherwise positioned directly adjacent to the hopper gate 102. When the hopper gate 102 and the rear deflector 112 are located at such positions, the storage hopper 100 may be configured to define a storage volume 104 for storing the harvested crop expelled from the distal end 64 of the elevator 60. Specifically, as shown in FIG. 3, the storage volume 104 may extend between a forward end 126 defined by the front deflector 116 and a rear end 128 defined by the rear deflector 112. Additionally, the storage volume 104 may extend crosswise between the opposed sidewalls 114 of the hopper 100 and vertically between the distal end 64 of the elevator 60 and the hopper gate 102. Thus, harvested crops expelled from the distal end 64 of the elevator 60 may fall down onto the bottom of the storage volume 104 defined by the hopper gate 102 and pile up vertically within the storage volume 104 between the front and rear deflectors 116, 112 and the opposed sidewalls 114.

It should be appreciated that the storage volume 104 defined by the storage hopper 100 may generally correspond to any suitable volume sufficient to store a desired amount of billets within the hopper 100. However, in several embodiments, the storage hopper 100 may be configured such that the storage volume 104 is substantially equal to the maximum storage volume defined by the top span 70 of the elevator 60 (i.e., the top side of the elevator 60 along which the billets are conveyed between the elevator's proximal and distal ends 62, 64). As used herein, the storage volume 104 defined by the storage hopper 100 may be considered to be substantially equal to the maximum storage volume defined by the top elevator span 70 if the storage volume 104 is within +/−20% of the maximum storage volume defined by the top elevator span 70, such as within +/−10% of the maximum storage volume defined by the top elevator span 70 or within +/−5% of the maximum storage volume defined by the top elevator span 70 and/or any other subranges therebetween.

Additionally, it should be appreciated that, in other embodiments, the rear deflector 112 may not be movable, but, instead, may be fixed or stationary. In such embodiments, only the hopper gate 102 may be configured to be moved to switch the operation of the harvester 10 between its discharge and storage harvesting modes. For instance, when it is desired to operate the harvester 10 in its storage harvesting mode, the hopper gate 102 may be moved towards the fixed rear deflector 112 to the storage position at which the hopper gate 102 contacts or is otherwise positioned directly adjacent to the deflector 112. Similarly, when it is desired to operate the harvester 10 in its discharge harvesting mode, the hopper gate 102 may be moved away from the rear deflector 112 to expose the discharge opening 82 of the elevator assembly 52.

As shown in FIGS. 2 and 3, in several embodiments, the elevator assembly 52 may include a gate actuator 130 configured to move the hopper gate 102 between its discharge and storage positions. In general, the gate actuator 130 may correspond to any suitable actuation mechanism and/or device. For instance, in one embodiment, the gate actuator 140 may include a gear and rack assembly for moving the hopper gate 102 between its discharge and storage positions. Specifically, as shown in FIGS. 2 and 3, the hopper gate 102 may include a rack 132 configured to engage a corresponding drive gear 134 coupled to a motor 136 (e.g., an electric motor or a hydraulic motor powered by the vehicle's hydraulic system). In such an embodiment, by rotationally driving the drive gear 134 in one direction or the other via the motor 136, the hopper gate 102 may be linearly actuated between its discharge and storage positions (e.g., as indicated by arrows 118, 122). Alternatively, the gate actuator 130 may correspond to any other suitable actuation mechanism and/or device, such as any other suitable linear actuator (e.g., a cylinder) and/or the like.

Additionally, in several embodiments, the elevator assembly 52 may include a deflector actuator 138 configured to move the rear deflector 112 between its opened and closed positions. In general, the deflector actuator 138 may correspond to any suitable actuation mechanism and/or device. For instance, in one embodiment, the deflector actuator 138 may correspond to a linear actuator, such as a fluid-driven cylinder actuator or an electric actuator (e.g., a solenoid-activated actuator). Specifically, as shown in FIGS. 2 and 3, the deflector actuator 138 may be coupled to a portion of the elevator housing 58 and/or a portion of the secondary extractor 78 and may include a drive rod 140 secured to a portion of the rear deflector 112. In such an embodiment, by linearly actuating the drive rod 140 in one direction or the other, the rear deflector 112 may be pivoted relative to the rear side 110 of the hopper 100 between its opened and closed positions. Alternatively, the deflector actuator 138 may correspond to any other suitable actuation mechanism and/or device, such as any other suitable linear actuator (e.g., a gear and rack assembly) and/or the like.

It should be appreciated that, in several embodiments, the operation of the gate actuator 130 and/or the deflector actuator 138 may be configured to be electronically controlled via a controller 142 of the harvester 10. For instance, as shown in FIGS. 2 and 3, the controller 142 may be communicatively coupled to the gate actuator 130 and the deflector actuator 138 via one or more communicative links 144, such as a wired connection and/or a wireless connection. In the event that the gate actuator 130 and/or the deflector actuator 138 corresponds to a fluid-driven component(s), the controller 142 may, instead, be communicatively coupled to suitable electronically controlled valves and/or other suitable fluid-related components for controlling the operation of the actuator(s) 130, 138. Regardless, by providing the disclosed communicative links between the controller 142 and the actuators 130, 138, the controller 142 may be configured to control the operation of the actuators 130, 138 based on inputs received from the operator of the harvester 10. For instance, as will be described below, the controller 142 may be configured to receive operator inputs associated with the desired operating mode for the harvester 10. Specifically, the operator may provide an operator input indicating the desire to switch the operation of the harvester 10 from the discharge harvesting mode to the storage harvesting mode. In such instance, the controller 142 may be configured to electronically control the operation of the actuators 130, 138 to move the hopper gate 102 to its storage position and the rear deflector 112 to its closed position. Similarly, if the operator provides an operator input indicating the desire to switch the operation of the harvester 10 from the storage harvesting mode back to the discharge harvesting mode, the controller 142 may be configured to electronically control the operation of the actuators 130, 138 to move the hopper gate 102 to its discharge position and the rear deflector 112 to its opened position.

In general, the controller 142 may correspond to any suitable processor-based device known in the art, such as a computing device or any suitable combination of computing devices. Thus, in several embodiments, the controller 142 may include one or more processor(s) 146 and associated memory device(s) 148 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 148 of the controller 142 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 148 may generally be configured to store suitable computer-readable instructions that, when implemented by the processor(s) 146, configure the controller 142 to perform various computer-implemented functions, such as one or more aspects of the method 200 described below with reference to FIG. 4. In addition, the controller 142 may also include various other suitable components, such as a communications circuit or module, one or more input/output channels, a data/control bus and/or the like.

It should be appreciated that the controller 142 may correspond to an existing controller of the harvester 10 or the controller 142 may correspond to a separate processing device. For instance, in one embodiment, the controller 142 may form all or part of a separate plug-in module that may be installed within the harvester 10 to allow the present subject matter to be implemented without requiring additional software to be uploaded onto existing control devices of the harvester 10.

It should also be appreciated that the controller 142 may be configured to electronically control any other suitable components of the harvester 10 in addition to the above-described actuators 130, 138. For instance, as shown in FIGS. 2 and 3, the controller 142 may be communicatively coupled to the elevator motor 76 for controlling the operation of the elevator 60. For instance, the controller 142 may electronically control the operation of the elevator motor 76 to automatically adjust the operational speed of the elevator 60 and/or the start/stop the elevator 60, as desired.

Referring still to FIGS. 2 and 3, in several embodiments, a sealing device 150 may be provided at the top end of the front deflector 112 for sealing the gap defined between the front deflector 116 and the paddles 68 of the elevator 60 as the paddles 68 are conveyed past the deflector 116. For instance, in one embodiment, the sealing device 150 may correspond to a flexible sealing member, such as a brush seal or an elastic seal. In such an embodiment, the sealing device 150 may be configured to flex or bend as the paddles 68 are conveyed past the front deflector 116. By providing the sealing device 150, the billets stored within the storage volume 104 of the hopper 100 when the harvester 10 is operating in its storage harvesting mode may be prevented from tumbling over the top of the front deflector 116 and falling from the hopper 100.

Referring now to FIG. 4, a flow diagram of one embodiment of a method 200 for operating a harvester is illustrated in accordance with aspects of the present subject matter. In general, the method 200 will be described herein with reference to the embodiment of the harvester 10 described above with reference to FIGS. 1-3. However, it should be appreciated by those of ordinary skill in the art that the disclosed method 200 may generally be implemented with any harvester 10 having any suitable harvester configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include initially operating the harvester in a discharge harvesting mode in which harvested crops are discharged from the discharge opening defined by the storage hopper of the elevator assembly. Specifically, as indicated above, when operating in the discharge harvesting mode, the hopper gate 102 and the rear deflector 112 may be moved to their associated positions shown in FIG. 2 (e.g., the discharge position and the opened position) for allowing the billets expelled from the distal end 64 of the elevator 60 to fall through the storage hopper 100 and be discharged from the elevator assembly 52 via the discharge opening 82. The billets discharged from the elevator assembly 52 may then fall into an external storage device, such as a sugar cane billet cart.

Additionally, at (204), the method 200 may include receiving an operator input associated with switching the operation of the harvester from its discharge harvesting mode to its storage harvesting mode. For instance, as indicated above, it may be desirable to operate the harvester 10 in its storage harvesting mode when an associated external storage device is not properly positioned relative to the discharge opening 82 for collecting the discharged billets, such as when rotating the billet carts and/or when turning/resuming harvesting at the end of row without the billet cart being in position. In such instance(s), the operator may be allowed to provide a suitable operator input to the vehicle's controller 142 indicating the desire to switch operation of the harvester 10 to the storage harvesting mode.

For instance, a suitable input device (e.g., a button, knob, lever, switch, etc.) may be provided within the operator's cab 18 to allow the operator to provide the operator input to the controller 142.

Moreover, at (206), the method 200 may include moving the hopper gate and/or the rear deflector of the storage hopper to a suitable position for defining a storage volume within the storage hopper for storing the harvested crops upon receipt of the operator input. Specifically, in several embodiments, when operating the harvester 10 in the storage harvesting mode, the hopper gate 102 may be configured to be moved to its storage position and the rear deflector 112 may be configured to be moved to its closed position so that the storage hopper 100 defines a storage volume 104 for receiving the billets expelled from the distal end 64 of the elevator 60. As indicated above, the vehicle's controller 142 may be configured to automatically move the hopper gate 102 and the rear deflector 112 to their respective positions upon receiving the input from the operator indicating his/her desire to operate the harvester 10 in the storage harvesting mode.

Further, at (208), the method 200 may also include reducing an operational speed of the elevator 60 upon receipt of the operator input. Specifically, in addition to moving the hopper gate 102 and/or the rear deflector 112, the operational speed of the elevator 60 may be reduced from its normal operational speed (e.g., the operational speed of the elevator 60 when the harvester 10 is operated in its discharge harvesting mode) to a decreased operational speed. In one embodiment, the elevator speed may be reduced to a predetermined operational speed, such as a speed ranging from about 10% to about 25% of the normal operational speed of the elevator 60. Alternatively, the decreased operational speed of the elevator 60 may be determined as a function of one or more operational parameters of the harvester 10, such as the current yield of the harvester 10, the current feed rate of the harvester 10, and/or the current ground speed of the harvester 10. As indicated above, the operational speed of the elevator 60 may be automatically controlled by the vehicle's controller 142 (e.g., by controlling the operation of the elevator motor 76).

Referring still to FIG. 4, at (210), the method 200 may include continuing operation of the elevator at the reduced speed so that the harvested crops are expelled from the elevator into the storage volume defined by the storage hopper as the elevator is moved a conveyance distance corresponding to the distance of the top elevator span. Specifically, in several embodiments, after moving the hopper gate 102 and/or the rear deflector 112 to their respective positions, the elevator 60 may be operated at the reduced operational speed until the elevator 60 has moved one half of its total travel distance (i.e., the conveyance distance defined along the top span 70 of the elevator 60 between its proximal and distal ends 62, 64). In doing so, as the elevator 60 is moved such conveyance distance, the billets initially contained within the top elevator span 70 may be dumped into the storage volume 104 while concurrently filling the paddles 68 moving into the top elevator span 70 to their maximum fill level.

Additionally, at (212), the method 200 may include stopping the operation of the elevator 60 after the elevator 60 has been moved the specified conveyance distance. Specifically, once the elevator 60 has moved the conveyance distance defined along the top span 70 of the elevator 60 between its proximal and distal ends 62, 64 (thereby allowing both the storage hopper 100 and the top elevator span 70 to be filled with billets), the elevator operation may be halted. As indicated above, the elevator 60 may be automatically stopped by the vehicle's controller 142 (e.g., by controlling the operation of the elevator motor 76). In such an embodiment, the controller 142 may be configured to determine when the elevator 60 has been moved the specified conveyance distance by monitoring the time across which the elevator 60 has been operated at its reduced speed and/or by monitoring the actual distance across which the elevator 60 has been conveyed.

Moreover, at (214), the method 200 may include maintaining the remainder of the harvester operational to allow harvested crops to be stored within a lower storage volume of the elevator assembly for a predetermined time period after stopping the operation of the elevator. Specifically, upon stopping the elevator 60, the harvester 10 may continue to be used to harvest sugar cane for a given time period (e.g., three to ten seconds). In such instance, the harvested billets may be stored within a lower storage hopper 152 (FIG. 1) defined at or adjacent to the proximal end 62 of the elevator 60.

Further, at (216), the method 200 may include stopping the operation of the harvester after the predetermined time period has elapsed. Specifically, following the continued operation of the harvester 10 for the predetermined time period after stopping the elevator 60, it may be assumed that the elevator assembly 62 is at full capacity. In such instance, the harvester 10 may be stopped to discontinue harvesting of the sugar cane.

It should be appreciated that the disclosed method 200 may allow a harvester 10 to be operated without unloading harvested crops for a significant period of time (e.g., fifteen to forty seconds depending on the throughput of the harvester 10 and the length/capacity of the elevator 60), thereby providing sufficient time to allow an external storage device (e.g., a billet cart) to be positioned relative to the harvester 10. In general, it is anticipated that the external storage device may be properly positioned relative to the harvester 10 in the time period required for the elevator 60 to be moved the conveyance distance defined along the top span 70 of the elevator 60 between its proximal and distal ends 62, 64. As such, in most instances, it is believed that the operation of the harvester 10 can be switched back to its discharge harvesting mode prior to stopping the operation of the elevator 60. However, in the event that the external storage device is not properly positioned relative to the harvester 10 prior to such point, the remainder of the disclosed method 200 (e.g., method elements 212-216) may be implemented to provide for continued, temporary operation of the harvester until the eternal storage device is in place.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An elevator assembly for a harvester, comprising:
an elevator housing;
an elevator extending within the elevator housing between a proximal end and a distal end, the elevator configured to carry harvested crops between its proximal and distal ends, wherein the elevator comprises a plurality of paddles configured to be conveyed between the proximal and distal ends of the elevator;

a storage hopper extending from the elevator housing at a location adjacent to the distal end of the elevator, the storage hopper including a front deflector, a rear deflector configured to be spaced apart from the front deflector, and a hopper gate, the hopper gate being movable between a discharge position to allow the harvested crops to be discharged from the elevator assembly through a discharge opening, and a storage position to prevent the harvested crops from being discharged from the elevator assembly, wherein, when the hopper gate is moved to the storage position, the storage hopper is configured to at least partially define a storage volume adjacent to the distal end of the elevator for storing the harvested crop; and a seal extending outwardly from the front deflector, the seal being configured to seal a gap defined between the front deflector and each paddle as the paddle is conveyed past the front deflector during operation of the elevator.

2. The elevator assembly of claim 1, wherein the storage volume is defined at least partially at a location below the distal end of the elevator such that the harvested crop expelled from the elevator at its distal end falls downs into the storage volume when the storage hopper is moved to the storage position without being re-circulated back towards the proximal end of the elevator.

3. The elevator assembly of claim 1, wherein, when the hopper gate is moved to the storage position, the front deflector defines a forward end of the storage volume and the rear deflector defines a rear end of the storage volume.

4. The elevator assembly of claim 1, further comprising a gate actuator configured to move the hopper gate between the discharge and storage positions.

5. The elevator assembly of claim 4, wherein the gate actuator comprises a gear and rack assembly for moving the hopper gate between the discharge and storage positions.

6. The elevator assembly of claim 1, wherein the elevator defines a top elevator span extending between its proximal and distal ends, the top elevator span defining a maximum crop storage volume, wherein the storage volume defined by the storage hopper is substantially equal to the maximum crop storage volume of the top elevator span.

7. The elevator assembly of claim 1, wherein the rear deflector is movable between an opened position and a closed position, the rear deflector being moved to the closed position when the hopper gate is moved to the storage position to allow the rear deflector and the hopper gate to at least partially define the storage volume.

8. The elevator assembly of claim 7, further comprising a deflector actuator configured to move the rear deflector between the opened and closed positions.

9. The elevator assembly of claim 8, wherein the deflector actuator is configured to pivot the rear deflector away from the hopper gate to move the rear deflector from the closed position to the opened position.

10. A method for operating a harvester, the harvester comprising an elevator assembly including an elevator extending between a proximal end and a distal end, the elevator assembly further including a storage hopper positioned adjacent to the distal end of the elevator, the storage hopper including a front deflector positioned below the elevator and a rear deflector movable between a discharge position and a storage position, the method comprising:

initially operating the harvester in a discharge harvesting mode such that harvested crops are conveyed from the proximal end of the elevator to the distal end of the elevator and subsequently discharged from the harvester through a discharge opening defined by the storage hopper;

receiving an operator input associated with operating the harvester in a storage harvesting mode; and storing the harvested crops expelled from the distal end of the elevator within a storage volume at least partially defined by the front deflector and the rear deflector.

11. The method of claim 10, further comprising:

upon receipt of the operator input, moving a hopper gate from its discharge position to its storage position such that the hopper gate covers the discharge opening; and moving the rear deflector from an opened position to a closed position upon receipt of the operator input, wherein the hopper gate and the rear deflector at least partially define the storage volume when the hopper gate is located at its storage position and the rear deflector is located at its closed position.

12. The method of claim 10, further comprising reducing an operating speed of the elevator upon receipt of the operator input.

13. The method of claim 12, wherein the operating speed of the elevator is reduced to a speed ranging from about 10% to about 25% of an operational speed of the elevator during operation in the discharge harvesting mode.

14. The method of claim 12, wherein reducing the operating speed of the elevator comprises reducing the operating speed of the elevator as a function of at least one of a current yield of the harvester, a current feed rate for the harvester, or a current ground speed of the harvester.

15. The method of claim 11, further comprising:

upon moving the hopper gate to its storage position, operating the elevator such that the elevator is moved a conveyance distance corresponding to a distance of a top elevator span defined between the proximal and distal ends of the elevator; and stopping the operation of the elevator once the elevator has being moved the conveyance distance.

16. The method of claim 15, further comprising continuing operation of the harvester for a predetermined time period after stopping the operation of the elevator to allow the harvested crops to be stored within a lower storage hopper defined adjacent to the proximal end of the elevator.

17. The method of claim 16, further comprising stopping the operation of the harvester once the predetermined time period has elapsed.

18. The method of claim 11, wherein the storage volume is defined at least partially at a location below the distal end of the elevator such that the harvested crop expelled from the elevator at its distal end falls downs into the storage volume when the hopper gate is moved to the storage position without being re-circulated back towards the proximal end of the elevator.

19. The method of claim 10, wherein the elevator defines a top elevator span extending between its proximal and distal ends, the top elevator span defining a maximum crop storage volume, wherein the storage volume defined by the storage hopper is substantially equal to the maximum crop storage volume of the top elevator span.

* * * * *